(12) United States Patent
Kasten et al.

(10) Patent No.: US 9,058,096 B2
(45) Date of Patent: Jun. 16, 2015

(54) METHODS AND SYSTEMS FOR INDICATING APPLICATION DATA USE AND PROVIDING DATA ACCORDING TO PERMISSIONS

(71) Applicant: Google Inc., Mountain View, CA (US)

(72) Inventors: Glenn Kasten, San Mateo, CA (US); James Fintan Kelly, Milpitas, CA (US); Nirdhar Khazanie, Greenville, NC (US); Joshua Michael Armour, Mountain View, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 14/137,268

(22) Filed: Dec. 20, 2013

(65) Prior Publication Data

US 2015/0113461 A1    Apr. 23, 2015

Related U.S. Application Data

(60) Provisional application No. 61/893,510, filed on Oct. 21, 2013.

(51) Int. Cl.
    *G06F 3/048*    (2013.01)
    *G06F 3/0484*   (2013.01)

(52) U.S. Cl.
    CPC .................................. *G06F 3/0484* (2013.01)

(58) Field of Classification Search
    CPC .................... G06F 21/6254; G06F 2221/2129; G06F 3/0487
    USPC ................................................. 715/771, 772
    See application file for complete search history.

(56) References Cited

U.S. PATENT DOCUMENTS

| | | | | |
|---|---|---|---|---|
| 5,852,721 | A * | 12/1998 | Dillon et al. ................... | 709/217 |
| 8,312,660 | B1 * | 11/2012 | Fujisaki ........................ | 42/70.11 |
| 2002/0041240 | A1 * | 4/2002 | Ikeda et al. .................... | 340/993 |
| 2003/0220798 | A1 * | 11/2003 | Schmid et al. ................ | 704/276 |
| 2004/0078591 | A1 * | 4/2004 | Teixeira et al. ................ | 713/201 |
| 2004/0090469 | A1 * | 5/2004 | Moon et al. .................... | 345/846 |
| 2005/0151719 | A1 * | 7/2005 | Geddes et al. ................ | 345/156 |
| 2007/0143493 | A1 * | 6/2007 | Mullig et al. .................. | 709/232 |
| 2007/0239456 | A1 * | 10/2007 | Goodman et al. ............. | 704/270 |
| 2007/0266310 | A1 * | 11/2007 | Sasaki et al. ................... | 715/513 |

(Continued)

OTHER PUBLICATIONS

"Smartphone Apps Quietly Using Phone Microphones and Cameras to Gather Data", Tech Dirt, accessed Dec. 20, 2013, http://www.techdirt.com/blog/wireless/articles/20110417/21485513927/smartphone-apps-quietly-using-phone-microphones-cameras-to-gather-data.shtml.

*Primary Examiner* — Daeho Song
(74) *Attorney, Agent, or Firm* — McDonnell Boehnen Hulbert & Berghoff LLP

(57) ABSTRACT

Methods and systems for indicating application data use and providing data according to permissions are described. An example method may include providing for display, by a computing device that includes one or more processors, a representation of a first indicator and the first indicator indicates a sensor of the computing device is collecting sensory data from an ambient environment of the computing device. The first indicator is configured to change states so as to further indicate an application running on the computing device is receiving and processing the sensory data. The method further includes providing for display, by the computing device, a representation of a second indicator that identifies the application receiving the sensory data collected by the sensor of the computing device.

20 Claims, 10 Drawing Sheets

(56) References Cited

U.S. PATENT DOCUMENTS

| | | | |
|---|---|---|---|
| 2007/0298772 A1* | 12/2007 | Owens et al. | 455/414.1 |
| 2008/0008162 A1* | 1/2008 | Martinez et al. | 370/352 |
| 2008/0077620 A1* | 3/2008 | Gilley et al. | 707/104.1 |
| 2009/0088221 A1* | 4/2009 | Gilbert et al. | 455/567 |
| 2009/0240193 A1* | 9/2009 | Mensinger et al. | 604/66 |
| 2010/0205274 A1* | 8/2010 | Gharabally et al. | 709/217 |
| 2010/0255830 A1* | 10/2010 | Manolescu et al. | 455/418 |
| 2011/0154244 A1* | 6/2011 | Howell et al. | 715/772 |
| 2012/0001755 A1* | 1/2012 | Conrady | 340/540 |
| 2012/0046767 A1* | 2/2012 | Shimohata et al. | 700/91 |
| 2012/0090004 A1* | 4/2012 | Jeong | 725/39 |
| 2012/0240238 A1* | 9/2012 | Gates et al. | 726/26 |
| 2012/0329447 A1* | 12/2012 | Gilbert et al. | 455/420 |
| 2013/0281124 A1* | 10/2013 | Laumen et al. | 455/456.3 |
| 2014/0004797 A1* | 1/2014 | Vonog et al. | 455/41.2 |

* cited by examiner

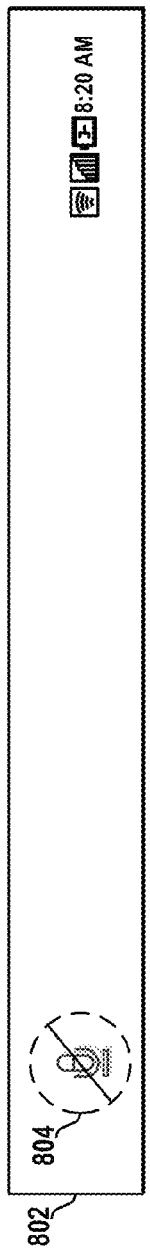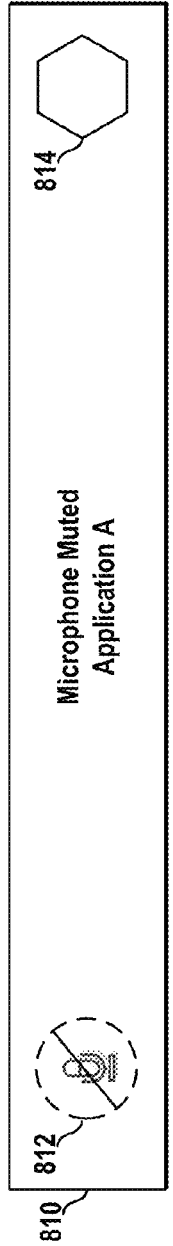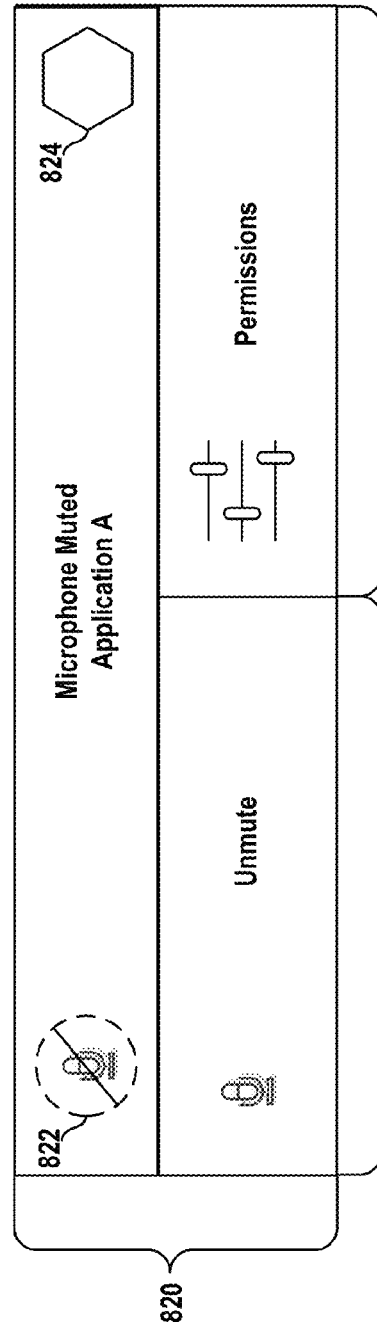

METHODS AND SYSTEMS FOR INDICATING APPLICATION DATA USE AND PROVIDING DATA ACCORDING TO PERMISSIONS

CROSS REFERENCE TO RELATED APPLICATION

The present disclosure claims priority to U.S. Provisional Patent Application No. 61/893,510, filed on Oct. 21, 2013, the entire contents of which are herein incorporated by reference.

BACKGROUND

Unless otherwise indicated herein, the materials described in this section are not prior art to the claims in this application and are not admitted to be prior art by inclusion in this section.

Many techniques and systems exist for indicating application data use and providing data according to permissions. For example, a sound recorder may include a visual indicator that indicates the sound recorder is collecting audio data and storing the data. By further example, a computing device may include an application configured to run on the computing device. Based on being initiated, the application may cause the computing device to request for an input indicating that the application is allowed to transmit data to a server.

SUMMARY

In one example, a method is provided that includes providing for display, by a computing device that includes one or more processors, a representation of a first indicator, and the first indicator indicates a sensor of the computing device is collecting sensory data from an ambient environment of the computing device. The first indicator is configured to change states so as to further indicate an application running on the computing device is receiving and processing the sensory data. The method further includes providing for display, by the computing device, a representation of a second indicator that identifies the application receiving the sensory data collected by the sensor of the computing device.

In another example, a computer readable storage memory having stored therein instructions, that when executed by a computing device that includes one or more processors, cause the computing device to perform functions is provided. The functions comprise providing for display a representation of a first indicator and the first indicator indicates a sensor of the computing device is collecting sensory data from an ambient environment of the computing device. The first indicator is configured to change states so as to further indicate an application running on the computing device is receiving and processing the sensory data. The functions further comprise providing for display a representation of a second indicator that identifies the application receiving the sensory data collected by the sensor of the computing device.

In still another example, a system is provided that comprises one or more processors and memory configured to store instructions, that when executed by the one or more processors, cause the system to perform functions. The functions comprise providing for display a representation of a first indicator and the first indicator indicates the system is collecting sensory data from an ambient environment. The first indicator is configured to change states so as to further indicate an application running on the system is receiving and processing the sensory data. The functions further comprise providing for display a representation of a second indicator that identifies the application receiving the sensory data collected by the system.

In yet another example, a system is provided that includes a means for providing for display a representation of a first indicator and the first indicator indicates the system is collecting sensory data from an ambient environment. The first indicator is configured to change states so as to further indicate an application running on the system is receiving and processing the sensory data. The system further comprises means for providing for display a representation of a second indicator that identifies the application receiving the sensory data collected by the system.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 8A-C are illustrations of example displays associated with the described method.

DETAILED DESCRIPTION

Figure 1:
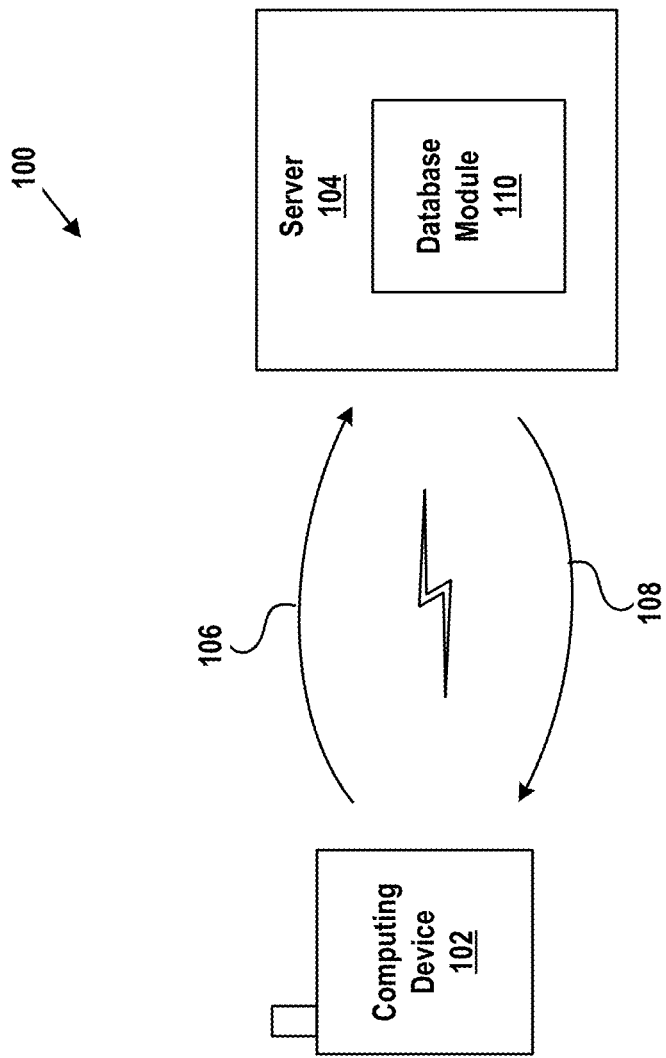
FIG. 1 illustrates an example communication system by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a computing device may be configured to provide for display a representation of a first indicator. The first indicator may indicate that a sensor of the computing device is collecting sensory data from an ambient environment of the computing device. The sensor may include a wireless internet receiver, a radio antenna, a GPS sensor, a magnetometer, a microphone, a sound meter, a photodetector, an accelerometer, or a camera, as just some examples. Sensory data may include video data or audio data or any other type of data the sensor is configured to collect. The first indicator may be configured to changes states so as to further indicate an application running on the computing device is receiving and processing the sensory data. The representation of the first indicator may be provided by a processor of the computing device and the first indicator may be displayed on a display screen of the computing device. The first indicator may be visually indicative of functions the application is configured to perform by using the sensory data.

Within examples, a computing device may also be configured to provide for display a representation of a second indicator. The second indicator may identify an application receiving sensory data collected by a sensor of the computing device. The second indicator may also be configured to indicate that the application is denied access to the sensory data. The representation of the second indicator may be provided by a processor of the computing device and the second indicator may be displayed on a display screen of the computing device.

Within examples, applications configured to run on a computing device may be configured to receive and process sensory data, to run in a background on the computing device and listen for one or more predetermined keywords, and to run in the background and store the sensory data. The applications may be further configured to transmit the sensory data away from the computing device. The computing device may also be configured to deny the application access to the sensory data.

Within examples, a computing device may also be configured to provide a list of data use permissions. The computing device may be configured to receive a selection of one or more data use permissions pertaining to an application configured to run on the computing device and may provide sensory data to the application according to the selected data use permission.

The computing device may also be configured to provide a list of applications configured to run on the computing device. The computing device may receive a selection indicating at least one of the applications as an untrusted application. The computing device may also provide a list of data use permissions for untrusted applications and receive a selection of at least one data use permission for untrusted applications. The computing device may provide the sensory data to untrusted applications in accordance with the selected data use permissions for untrusted applications.

Referring now to the figures, FIG. 1 illustrates an example communication system 100 by which an example method may be implemented. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to, or receive data 108 from, the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Server 104 may include the same components as computing device 102. Further, the server 104 may be configured to send data 108 to or receive data 106 from the computing device 102. The server 104 may have a database module 110 configured to receive data from multiple computing devices, to aggregate and store the data, and to provide for display the data in various forms. The database module 110 may include information regarding applications that are configured for use on the computing device 102.

The data 106 received by the server 104 from the computing device 102 may take various forms. For example, the computing device 102 may provide data 106 regarding whether certain applications are installed on the computing device 102. The computing device 102 may also provide data 106 about sensory data collected by a sensor of the computing device 102. For example, computing device 102 may provide data 106 to server 104 that indicates that a certain amount of sensory data collected by a sensor of computing device 102 may be audio or visual content. Data 106 may indicate that the sensory data may have been collected by a wireless internet receiver, radio antenna, GPS sensor, magnetometer, microphone, sound meter, photodetector, accelerometer, or camera. The server 104 may then store and aggregate the data for display.

The data 108 sent to the computing device 102 from the server 104 may take various forms. For example, the server 104 may send to the computing device 102 data 108 indicative of applications that are configured to use the sensory data collected by a sensor of computing device 102.

Figure 2:
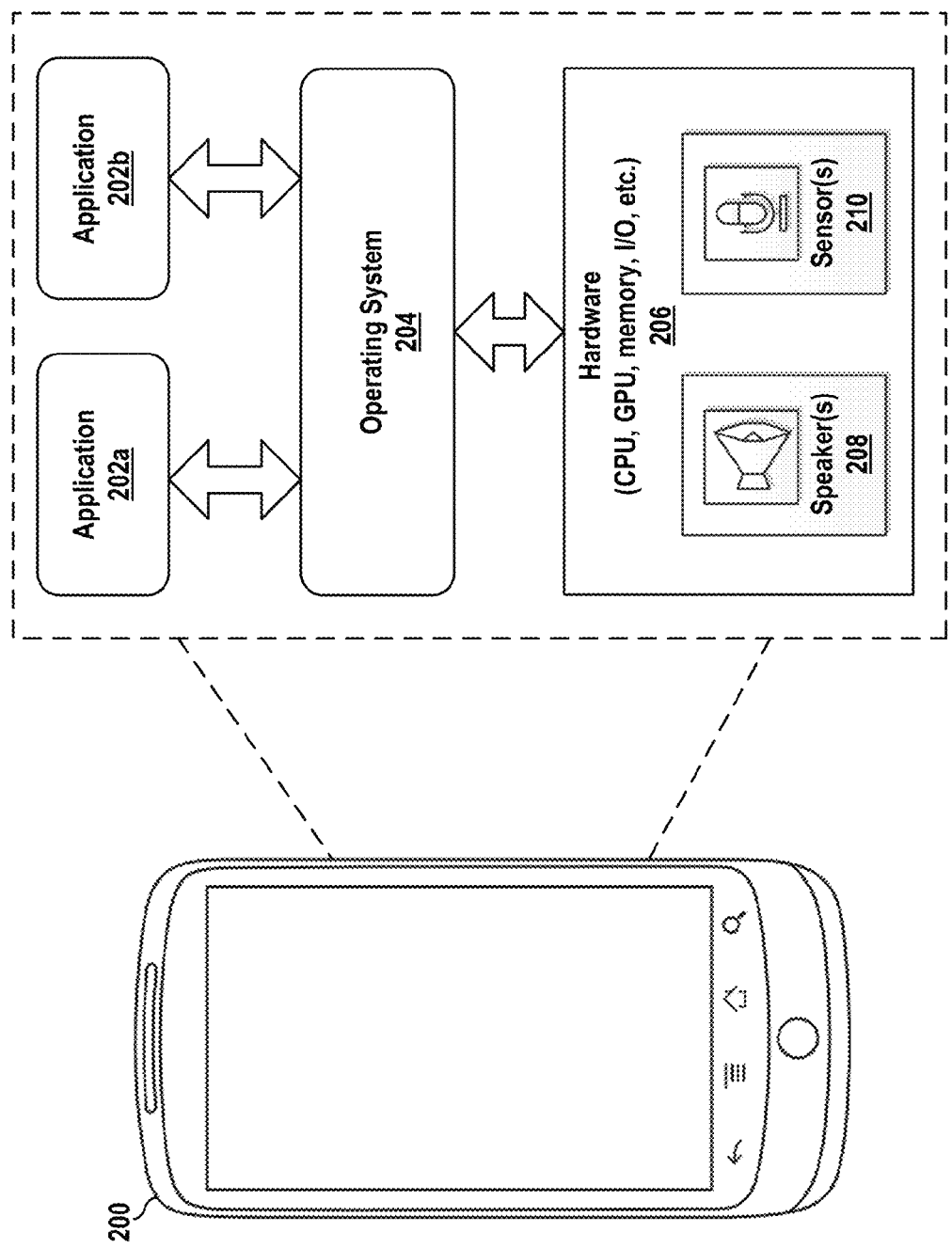
FIG. 2 illustrates an example computing device by which an example method may be implemented.

FIG. 2 illustrates an example computing device 200 by which an example method may be implemented. The computing device 200 may include applications 202a and 202b and an operating system 204 being executed by hardware 206. The hardware 206 may further include speaker(s) 208 and sensor(s) 210. Although the example computing device 200 is a smartphone, aspects of this disclosure are applicable to other computing devices such as desktop computers, laptops, tablet computers, etc.

Each of the applications 202a and 202b may include instructions that when executed cause the computing device 200 to perform specific tasks or functions. The applications 202a and 202b may be native applications (i.e., installed by a manufacturer of the computing device 200 and/or a manufacturer of the operating system 204) or may be a third-party applications installed by a user of the computing device 200 after purchasing the computing device. The applications 202a and 202b may be configured to use sensory data collected by sensor(s) 210 and provided by the CPU. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a voice recording application, a media identifier application, a voice transcription application, a bookmarking application, and a word processing, spreadsheet, and/or presentation application that accepts specifically formatted files as inputs and presents them via the output devices for viewing and/or editing.

The operating system 204 may interact with and manage the hardware 206 to provide services for the applications 202a and 202b. For example, an application 202a may request that the operating system 204 direct an integrated camera of hardware 206 to capture a visual image and that the hardware 206 store the image to memory. The operating system 204 may be executed by a CPU.

The hardware 206 may include, for example, a central processing unit (CPU), a graphics processor (GPU), memory, an input/output (I/O) interface, user input device(s), and output device(s). The hardware 206 may also include speaker(s) 208 and sensor(s) 210. Components of hardware 206 may be controlled by instructions included in applications 202a and 202b and operating system 204.

The central processing unit (CPU) may, for example, comprise a single or multi-core processor, an application specific integrated circuit (ASIC), field programmable gate array (FPGA), and/or any other suitable circuitry. The CPU may be operable to effectuate the operation of the computing device 200 by executing instructions stored in memory or disk storage. Such instructions may include the operating system 204 and the applications 202a and 202b. The CPU executing the instructions may cause sensory data to be written to or deleted from memory. The CPU may also receive sensory data from memory, sensory data from sensor(s) 210, and input data from an input/output interface. The CPU may also provide output data to an input/output interface.

The graphics processor may be operable to generate a video stream for output to a screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other memory. Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, an OLED screen, an e-ink screen, and/or any other suitable device for presenting a graphical user interface.

The speaker(s) 208 may be provided audio signals by the hardware 206 and produce sound waves based on the audio signals. The audio signals may be provided by the hardware 206 executing the applications 202a or 202b, or the operating system 204. The sensor(s) 210 may include a microphone configured to sense sound waves in the ambient environment of computing device 200. The sensor(s) 210 may also produce an audio signal based on the sound waves in the ambient environment of computing device 200. The sensor(s) 210 may provide the audio signal to hardware 206 which may further provide the signal for use by the operating system 204 and the applications 202a or 202b. The sensor(s) 210 may also include a camera configured to sense light waves in the ambient environment of the computing device 200. The camera may be configured to collect both continuous video and still-frame images. The sensor(s) 210 may also produce a video signal based on the light waves in the ambient environment of the computing device 200. The sensor(s) 210 may provide the video signal to the hardware 206 which may further provide the signal for use by the operating system 204 and the applications 202a or 202b. The sensor(s) 210 may be configured to collect any sensory data including ambient audio or video content, or wireless transmissions including internet-streamed audio or video, or AM/FM radio.

Figure 3:
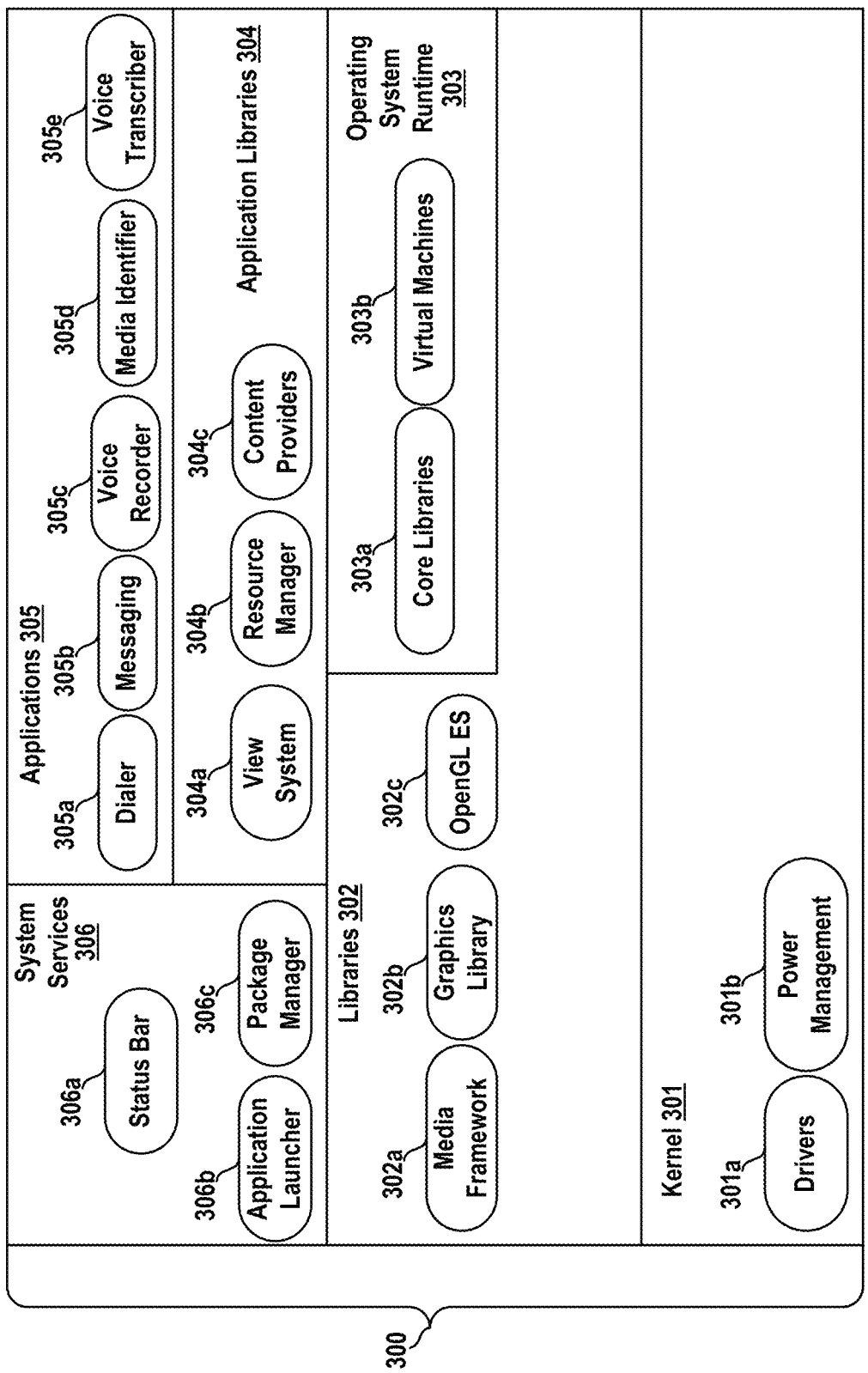
FIG. 3 is a block diagram illustrating example components of an operating system used by a computing device.

FIG. 3 is a block diagram illustrating example components of an operating system 300 used by a computing device. The operating system 300 may invoke multiple applications, while ensuring that an associated phone application is responsive and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 305 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305.

The applications 305 may include any number of applications, such as dialer 305a, messaging 305b, voice recorder 305c, media identifier 305d, and voice transcriber 305e. The dialer 305a may provide functionality related to placing or receiving phone calls. The messaging 305b may provide functionality related to receiving and sending messages, such as email, voice mail, or text messages. The voice recorder 305c may provide functionality related to sensing ambient sound waves and converting the sound waves into electronic data. The media identifier 305d may provide functionality related to determining the source of audio data. For example, if the audio data represents a musical recording, media identifier 305d may access a database to determine the artist(s) who composed the recording and when the recording was recorded. The voice transcriber 305e may provide functionality related to sensing ambient sound waves and converting the sound waves into data representing text. For example, the voice transcriber 305e may be provided an input representing audible speech and may produce output data representing an English transcription of the audible speech. The voice transcriber 305e may be configured to produce outputs in many languages.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4:
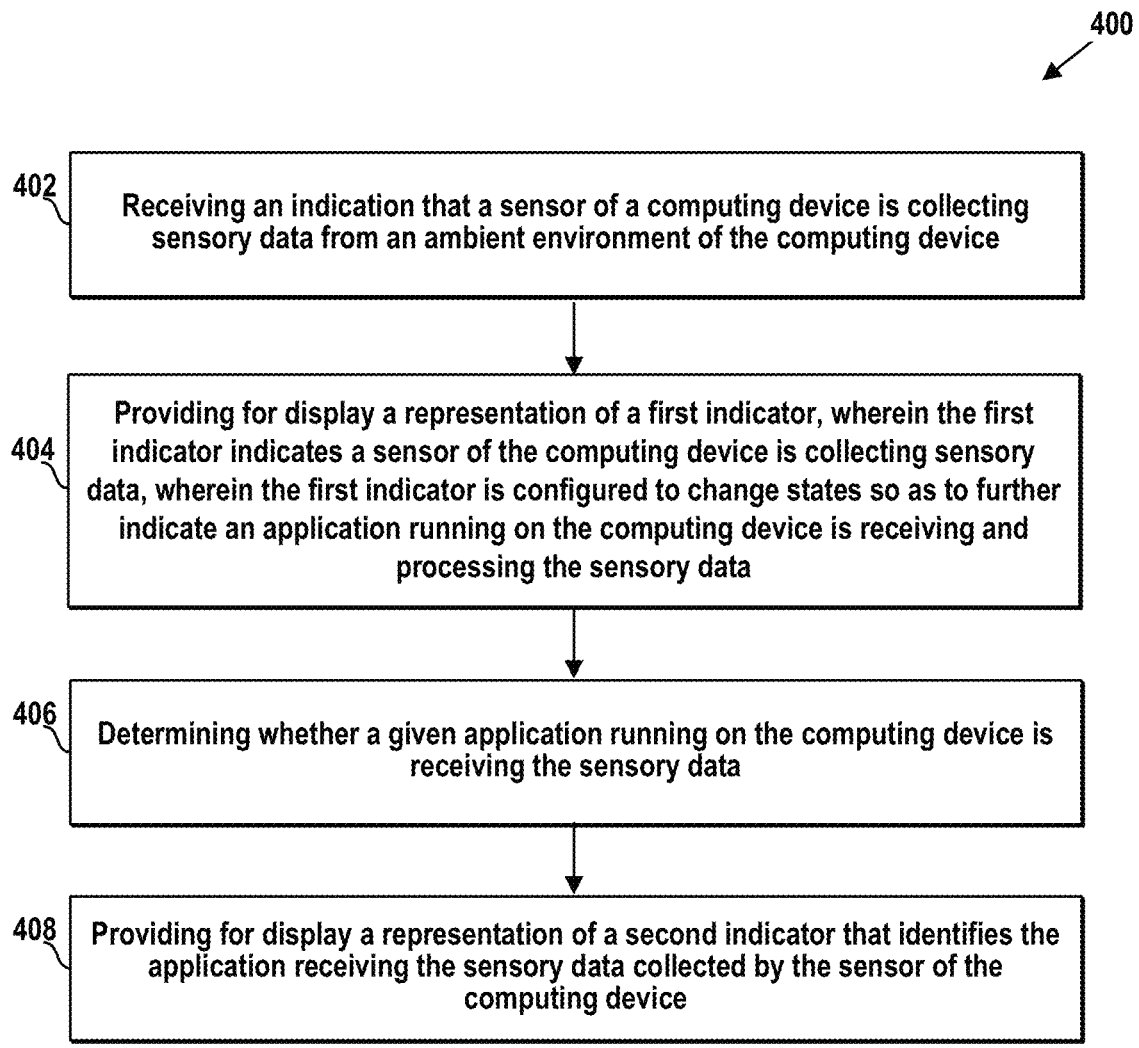
FIG. 4 is a block diagram of an example method for providing for display a first indicator and a second indicator.

FIG. 4 is a block diagram of an example method 400 for providing for display representations of a first indicator and a second indicator, in accordance with at least some embodiments described herein. Method 400 shown in FIG. 4 presents an embodiment of a method that, for example, could be used with a computing device. Method 400 may include one or more operations, functions, or actions as illustrated by one or more blocks of 402-408. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

Functions of the method 400 may be fully performed by a processor of a computing device, by a computing device, or may be distributed across multiple processors or multiple computing devices and/or a server. In some examples, the computing device may receive information from sensors of the computing device, or where the computing device is a server the information can be received from another device that collects the information.

At block 402, the method 400 includes receiving an indication that a sensor of a computing device is collecting sensory data from an ambient environment. The indication may be an electronic signal received by a processor of the computing device and provided by the sensor. The sensor may be a wireless internet receiver, a radio antenna, a GPS receiver, a magnetometer, a microphone, a sound meter, a photodetector, an accelerometer, or a camera. The computing device may be a laptop computer, a desktop computer, a tablet computer, or a smartphone. The sensory data collected from the ambient environment of the computing device may include audio data or visual data or any sensory data that the computing device is configured to detect. For example, the sensor may include a microphone configured to collect audio data and the indication may further indicate that the microphone is continuously collecting audio data from the ambient environment. By further example, the sensor may be a camera configured to collect video data and the indication may further indicate that the camera is continuously collecting video data from the ambient environment.

At block 404, the method 400 includes providing for display a representation of a first indicator. The representation of the first indicator may be provided by the processor and the first indicator may be displayed on a display of the computing device. The first indicator may be displayed based on receiving the indication that the sensor of the computing device is collecting sensory data from an ambient environment of the computing device. The first indicator may indicate that the sensor of the computing device is collecting sensory data from the ambient environment of the computing device. For example, the sensor may include a microphone and the first indicator may resemble a microphone. The first indicator may blink intermittently or otherwise be configured to indicate that the sensor is collecting sensory data.

The first indicator may also be configured to change states to one of a plurality of states. One state may indicate an application running on the computing device is receiving and processing the sensory data. Another state may indicate the application is running in a background on the computing device and listening for one or more predetermined keywords. For instance, the application may be configured to perform a function based on detection of the one or more predetermined keywords. Another state change may indicate the application is running in the background on the computing device and storing the sensory data in a memory device. A microphone indicator may include a red circular background that blinks intermittently to indicate that sensory data is being stored, and another indicator may show a visual representation of a memory device indicating that sensory data is being stored in the memory device. Yet another state change may indicate the application is running in the background or a foreground on the computing device and is transmitting the sensory data away from the computing device. Still another state change may indicate the application is denied access to the sensory data. Any combination of state changes may also be represented as well.

A change of state may include any number of visual changes to the indicator combined with any number of audio or physical outputs of the computing device. Some examples are described above. As another example, the first indicator may be configured to blink or change colors in a manner indicating that the microphone is actively listening for keywords. The first indicator may resemble a microphone enclosed by a circle, and the first indicator may be further configured to display a visual representation of sound waves or sound intensity levels that are being received by the sensor. The first indicator may further include text or icons representing the keywords, or text or icons representing the function that the computing device is configured to perform based on detecting the keywords. By further example, the first indicator may resemble a human ear, indicating that the application is running in the background and listening for one or more predetermined keywords. Further audio outputs may be combined with a state change to notify a user, or the computing device may also be configured to vibrate as well as a notification of a state change.

At block 406, the method 400 includes determining whether a given application running on the computing device is receiving and processing the sensory data. Applications running on the computing device may include, for example, a media identifier application, a speech recognition application, a word processor application, a GPS-enabled navigation application, and a video conferencing application. The processor may determine whether the given application is receiving and processing the sensory data based on outputs of the application, for example.

At block 408, the method 400 includes providing for display a representation of a second indicator that identifies the application receiving the sensory data collected by the sensor of the computing device. The representation of the second indicator may be provided by the processor and the second indicator may be displayed by the display of the computing device. The second indicator may be a visual representation of a function the application is configured to perform or may be a symbol otherwise recognizable as associated with the application. For example, the application may be a word processor application and the second indicator may resemble a notepad. The second indicator may be displayed based on determining that a given application is running on the computing device and is receiving and processing the sensory data. The second indicator may be further configured to identify the application that is denied access to the sensory data.

The first and second indicators may be included in a first row of the display. The first row may further include text indicating whether the application is denied access to the sensory data and text further identifying the application. The display may be included in a notification area or a notification drawer of an interactive display screen of the computing device. The notification area may be an area of the interactive display screen designated for displaying notification icons. The notification drawer may be an area of the interactive display screen designated for displaying notifications. The notification drawer may be displayed based on receiving an input at the notification area.

The method 400 may further include providing for display text indicative of one of the plurality of states. The text may be included in the first row of the display. The plurality of states may include the application is running in the background on the computing device and listening for one or more predetermined keywords that cause the application to perform a function. The plurality of states may further include the application is running in the background on the computing device and storing the sensory data. The plurality of states may further include the application is running in the background or a foreground on the computing device and transmitting the sensory data away from the computing device. The method may be useful to indicate a specific type of data use or uses by the application.

The method 400 may further include providing a mute toggle button in a second row of the display. The mute toggle button may be selectable to indicate whether the application is allowed access to the sensory data. For example, receiving an input at the mute toggle button may change a state of the computing device from allowing the application to access the sensory data to denying the application access to the sensory data. Selecting the mute toggle button for the application may leave sensory data access permissions for other applications unchanged. The selection may be received by the interactive display screen of the computing device.

The method 400 may further include providing a permissions button in the second row of the display. The permissions button may be selectable to indicate a list of data use permissions for the application. The selection may be received by the interactive display screen of the computing device. A list of data use permissions for the application may be displayed based on receiving an input at the permissions button.

The method 400 may further include providing for display a list of one or more data use permissions for the application. The one or more data use permissions may respectively describe functions the application is configured to perform by accessing the sensory data. A selection of a permission can be received and sensory data may be provided to the application for use in accordance with the selected permission. The one or more data use permissions may include running in the background on the computing device and listening for one or more predetermined keywords, running in the background on the computing device and storing the sensory data, and running in the background or the foreground on the computing device and transmitting the sensory data away from the computing device.

The method 400 may further include providing for display, a list of one or more applications configured to run on the computing device, and receiving a selection indicating that an application of the one or more applications is an untrusted application. An untrusted application may be an application allowed to access sensory data subject to selected data use permissions. A selected data use permission may describe a function that an untrusted application is configured to perform by accessing sensory data. In addition, data use permissions can be provided and selected indicating that a permission of the one or more data use permissions applies to a given untrusted application configured to run on the computing device. Sensory data can be provided to the untrusted application for use in accordance with the selected data use permission. The one or more data use permissions may include running in the background on the computing device and listening for one or more predetermined keywords, running in the background on the computing device and storing the sensory data, and running in the background or the foreground on the computing device and transmitting the sensory data away from the computing device.

Figure 5A:
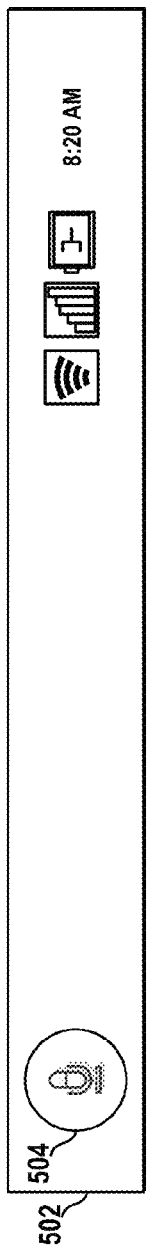
FIGS. 5A-C are illustrations of example displays associated with the described method.

FIG. 5A is an illustration of an example display associated with the described method. The display includes a notification area 502 and a first indicator 504.

The notification area 502 may be displayed near a perimeter of the interactive display screen of the computing device and may be designated to display symbols indicative of notifications. The first indicator 504 may be a symbol indicative of a notification indicating that the application is receiving and processing the sensory data. The notification area 502 may be configured to receive input indicating to display a notification drawer.

The first indicator 504 may include a visual representation of a microphone. However, the first indicator 504 may also include a visual representation of any sensor of the computing device. For example, the first indicator 504 may resemble a video camera. The first indicator 504 may blink intermittently or be otherwise animated within the interactive display screen of the computing device to indicate that the sensor of the computing device is collecting sensory data from an ambient environment. The first indicator 504 may change states to indicate that an application configured to run on the computing device is receiving and processing the sensory data. For example, while the application is running in a background on the computing device and listening for predetermined keywords, the first indicator 504 may resemble a microphone within a circular background. By further example, the first indicator 504 may resemble a human ear.

Figure 5B:
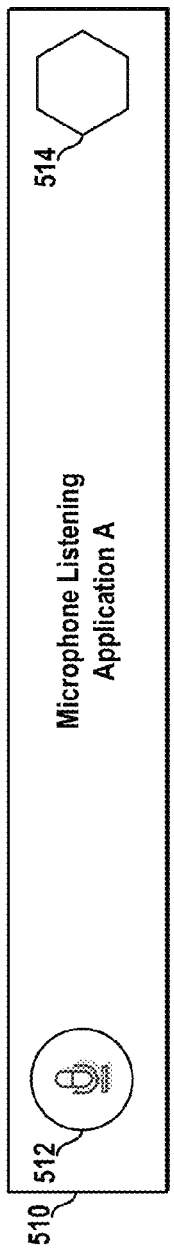

FIG. 5B is an illustration of an example display associated with the described method. The display includes a condensed notification area 510, a first indicator 512, and a second indicator 514.

The condensed notification 510 may include the first indicator 512 and the second indicator 514 in a common row. The condensed notification 510 may be displayed in the notification drawer of the interactive display screen and may include text in the common row indicating that the sensor is collecting sensory data and that the application is receiving and processing the sensory data. For example, the text may indicate that application A is listening for predetermined keywords.

The first indicator 512 may be proportionally larger than the first indicator 504, but may otherwise be identical in appearance. However, the first indicator 512 may also be a more detailed visual representation of the sensor. The first indicator 512 may resemble any visual representation that indicates that the application is listening for predetermined keywords.

The second indicator 514 may be a visual representation of the application receiving and processing sensory data. For example, application A may be a word processing application and the second indicator 514 may resemble a notepad. The second indicator 514 may also be any symbol recognizable as associated with application A.

Figure 5C:
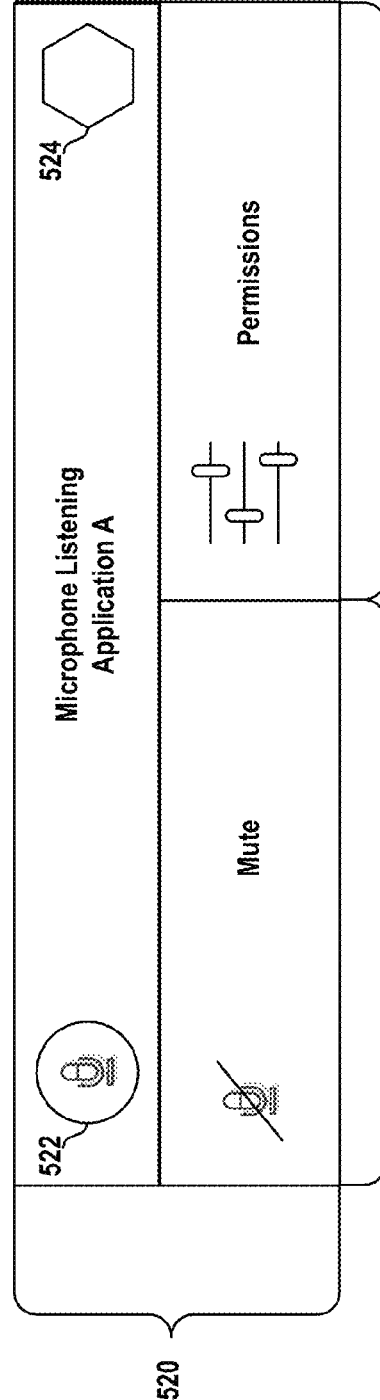

FIG. 5C is an illustration of an example display associated with the described method. The display includes an expanded notification 520, a first indicator 522, a second indicator 524, a mute toggle button 526, and a permissions button 528.

The expanded notification 520 may include the first indicator 522, the second indicator 524, the mute toggle button 526, and the permissions button 528. The expanded notification 520 may be displayed in the notification drawer of the interactive display screen. The expanded notification 520 may include a first row and a second row. The first row may include the first indicator 522 and the second indicator 524. The second row may include the mute toggle button 526 and the permissions button 528. The first row may be above the second row. In another example, the indicators may be included in columns or the second row may be displayed above the first row.

The mute toggle button 526 may be selectable to indicate whether the application is allowed to access sensory data. For example, an input received at the mute toggle button 526 may change the state of the computing device from allowing application A to receive and process sensory data to denying application A access to the sensory data. Receiving another input at the mute toggle button 526 may change the state of the computing device from denying application A access to the sensory data to allowing application A to receive and process sensory data. The mute toggle button 526 may include text indicating whether the application is receiving and processing the sensory data. Selecting the mute toggle button for the application may have no effect on whether other applications configured to run on the computing device are allowed to access sensory data or are denied access to the sensory data.

The permissions button 528 may be selectable to indicate a list of data use permissions for the application. For example, based on receiving an input at the permissions button 528, the computing device may display a list of selectable data use permissions. Based on selections received, the device may apply the one or more selected data use permissions to the application and the application may be provided sensory data in accordance with the permissions. The permissions button 528 may include text indicating the function of the permissions button 528. Data use permissions may include allowing the application to run in a background on the computing device and to listen for one or more predetermined keywords, allowing the application to run in the background on the computing device and to store the sensory data, and allowing the application to run in the background or a foreground on the computing device and to transmit the sensory data away from the computing device.

Figure 6A:
FIGS. 6A-C are illustrations of example displays associated with the described method.

FIG. 6A is another illustration of an example display associated with the described method. Illustrated in FIG. 6A are a notification area 602 and a first indicator 604.

The notification area 602 may be an area of the interactive display screen of the computing device designated to display symbols indicative of notifications. The notification area 602 may include the first indicator 604.

The first indicator 604 may indicate that the application is receiving and processing the sensory data. In some examples, the application may be storing sensory data to the memory device of the computing device and the first indicator 604 may include a representation of the memory device. The first indicator 604 may also resemble a microphone superimposed over a red circular background. The first indicator 604 may be configured to blink intermittently so as to indicate that the application is storing the sensory data.

Figure 6B:

FIG. 6B is an illustration of an example display associated with the described method. Illustrated in FIG. 6B are a condensed notification 610, a first indicator 612, and a second indicator 614.

Condensed notification 610 may include a first indicator 612 and second indicator 614. Condensed notification 610 may also include text indicative that a sensor of a computing device is collecting sensory data and that the application is storing the sensory data.

The first indicator 612 may include a visual representation of a microphone. However, the first indicator 612 may also include any visual representation of any sensor of the computing device. For example, the first indicator 612 may resemble a video camera. The first indicator 612 may blink intermittently or be otherwise animated within the interactive display screen of the computing device to indicate that a sensor of the computing device is collecting sensory data from an ambient environment. The first indicator 612 may be configured to change states to indicate that the application configured to run on the computing device is receiving and processing the sensory data. For example, while the application is running in a background on the computing device and storing the sensory data in a memory device, the first indicator 612 may resemble a microphone within a circular background. The microphone and the background may both have a red color. The first indicator 612 may further be configured to blink intermittently to indicate that the application is running in the background of the computing device and storing sensory data. By further example, while the application is running in the background on the computing device and storing sensory data in a memory device, the first indicator 612 may resemble a microphone and not include a circular background. By further example, the first indicator 612 may include a representation of a memory device indicating that the application is running in the background on the computing device and storing sensory data in the memory device.

The second indicator 614 may be a visual representation of the application storing sensory data, or any symbol recognizable as being associated with the application.

Figure 6C:
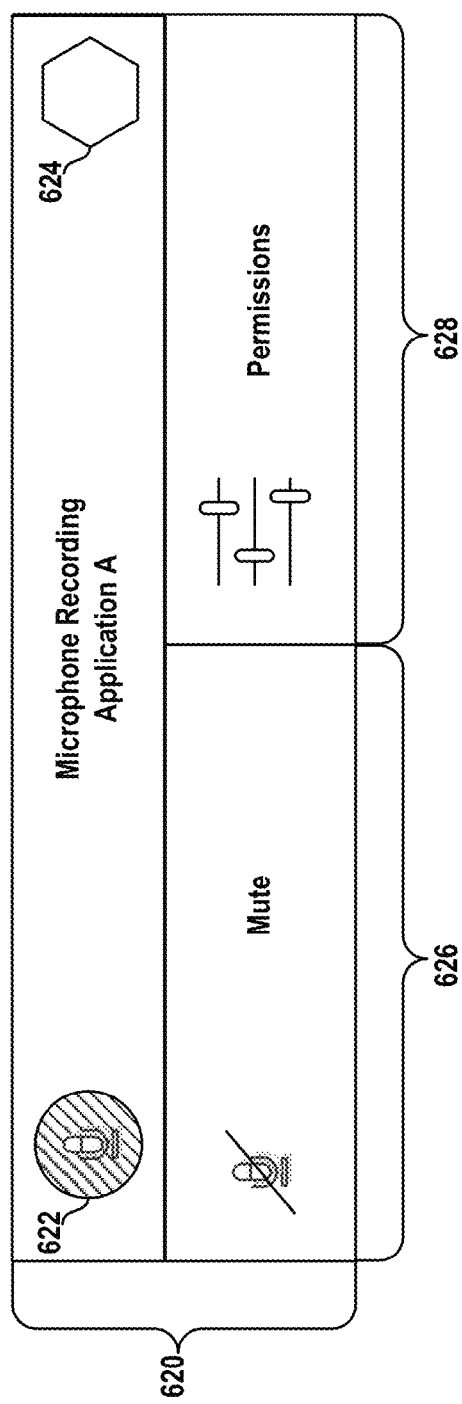

FIG. 6C is an illustration of an example display associated with the described method. Illustrated in FIG. 6C are an expanded notification area 620, a first indicator 622, a second indicator 624, a mute toggle button 626, and a permissions button 628.

The expanded notification 620 may include the first indicator 622, the second indicator 624, the mute toggle button 626, and the permissions button 628. The expanded notification 620 may be displayed in the notification drawer of the interactive display screen. The expanded notification 620 may include a first row and a second row. The first row may include the first indicator 622 and the second indicator 624. The second row may include the mute toggle button 626 and the permissions button 628.

The first indicator 622 may indicate that the application is storing sensory data to the memory device and may include a representation of the memory device. The first indicator 622 may also resemble a microphone superimposed over a red circular background. The first indicator 622 may be configured to blink intermittently so as to indicate that the application is storing the sensory data.

The second indicator 624 may be a visual representation of the application storing sensory data, or any symbol recognizable as being associated with the application.

The mute toggle button 626 may be configured to receive input indicating to change whether the application is receiving the sensory data. For example, in a state where the application is being denied the sensory data, a selection at the mute toggle button 626 may change the state of the computing device so that the application is receiving sensory data.

The permissions button 628 may be configured to receive input indicating to display a list of data use permissions corresponding to the application. The list of data use permissions may also be selectable so as to indicate data use permissions that are applied to the application.

Figure 7A:
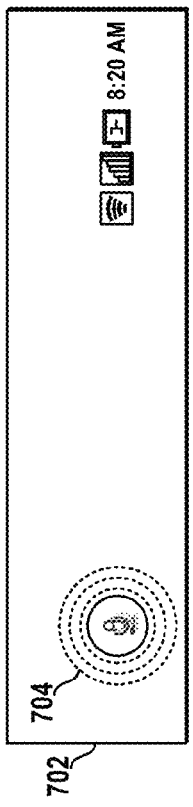
FIGS. 7A-C are illustrations of example displays associated with the described method.

FIG. 7A is an illustration of an example display associated with the described method. Illustrated in FIG. 7A are a notification area 702 and a first indicator 704.

The notification area 702 may be an area of the interactive display screen of the computing device designated to display symbols indicative of notifications. The notification area 702 may include the first indicator 704.

The first indicator 704 may indicate that the application is transmitting sensory data away from the computing device. The first indicator 704 may include several concentric circles emanating from a microphone, indicating that the application is transmitting the sensory data away from the computing device. The concentric circles may include dashed or solid lines and may be animated to resemble radio waves radiating away from the microphone. By further example, the first indicator 704 may resemble a satellite dish or a transmitting antenna indicating that the sensory data is leaving the computing device.

Figure 7B:
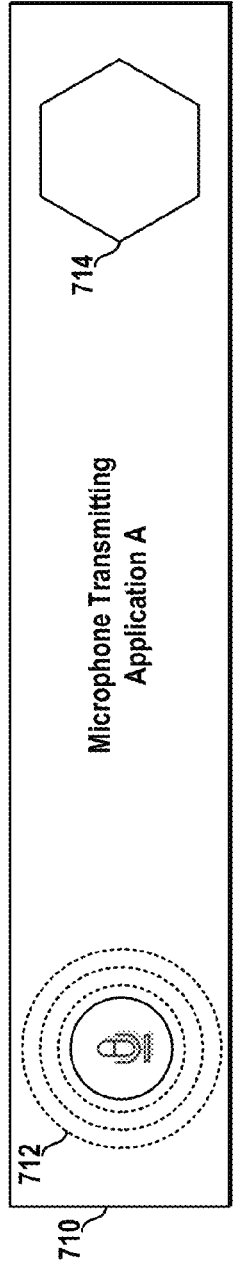

FIG. 7B is an illustration of an example display associated with the described method. Illustrated in FIG. 7B are a condensed notification area 710, a first indicator 712, and a second indicator 714.

The condensed notification 710 may include a first indicator 712. The condensed notification 710 may include text indicating that a sensor of a computing device is collecting sensory data and that an application configured to run on the computing device is receiving and processing the sensory data. For example, the text may indicate that application A is transmitting the sensory data away from the computing device.

The first indicator 712 may include a visual representation of a microphone. However, the first indicator 712 may also be any visual representation of any sensor of the computing device. For example, the first indicator 712 may resemble a video camera. The first indicator 712 may blink intermittently or be otherwise animated within the interactive display screen of the computing device to indicate that a sensor of the computing device is collecting sensory data from an ambient environment. The first indicator 712 may be configured to change states to indicate that an application configured to run on the computing device is receiving and processing the sensory data. For example, while the application is running in the foreground or the background on the computing device and transmitting the sensory data away from the computing device, the first indicator 712 may resemble a microphone within a circular background. The first indicator 712 may further be configured to blink intermittently to indicate that the application is running in the foreground or the background on the computing device and transmitting the sensory data away from the computing device. By further example, while the application is running in the foreground or the background on the computing device and transmitting the sensory data away from the computing device, the first indicator 712 may resemble a microphone and not include a circular background. By further example, the first indicator 712 may include several concentric circles emanating from a microphone, indicating that the application is transmitting the sensory data away from the computing device. The concentric circles may include dashed or solid lines and may be animated to resemble radio waves radiating away from the microphone. By further example, the first indicator 712 may resemble a satellite dish or a transmitting antenna indicating that the sensory data is leaving the computing device.

Figure 7C:
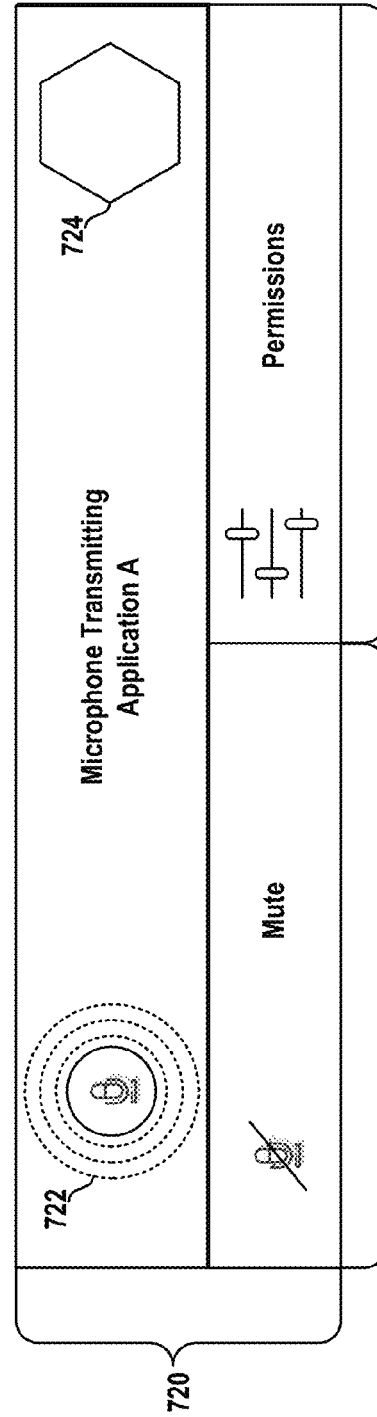

FIG. 7C is an illustration of an example display associated with the described method. Illustrated in FIG. 7C are an expanded notification 720, a first indicator 722, a second indicator 724, a mute toggle button 726, and a permissions button 728.

The expanded notification 720 may include the first indicator 722, the second indicator 724, the mute toggle button 726, and the permissions button 728. The expanded notification 720 may be displayed in the notification drawer of the interactive display screen. The expanded notification 720 may include a first row and a second row. The first row may include the first indicator 722 and the second indicator 724. The second row may include the mute toggle button 726 and the permissions button 728.

The first indicator 722 may include several concentric circles emanating from a microphone, indicating that the application is transmitting the sensory data away from the computing device. The concentric circles may include dashed or solid lines and may be animated to resemble radio waves radiating away from the microphone. By further example, the first indicator 722 may resemble a satellite dish or a transmitting antenna indicating that the sensory data is leaving the computing device.

The second indicator 724 may be a visual representation of the application transmitting sensory data, or any symbol recognizable as being associated with the application.

The mute toggle button 726 may be configured to receive input indicating to change whether the application is receiving the sensory data. For example, in a state where the application is being denied access to the sensory data, a selection at the mute toggle button 726 may change the state of the computing device so that the application is receiving sensory data.

The permissions button 728 may be configured to receive input indicating to display a list of data use permissions corresponding to the application. The list of data use permissions may also be selectable so as to indicate data use permissions that are applied to the application.

FIG. 8A is an illustration of an example display associated with the described method. Illustrated in FIG. 8A are a notification area 802 and a first indicator 804.

The notification area 802 may be an area of the interactive display screen of the computing device designated to display symbols indicative of notifications. The notification area 802 may include the first indicator 804.

The first indicator 804 may indicate that the application is denied access to the sensory data. The first indicator 804 may include a representation of a microphone within a circular area. For example, the circle may include dashed segments and a diagonal line bisecting the circle, distinguishing the first indicator 804 from other embodiments representing states where the application is receiving the sensory data.

FIG. 8B is an illustration of an example display associated with the described method. Illustrated in FIG. 8B are a condensed notification area 810 and a first indicator 812.

The condensed notification 810 may include a first indicator 812. The condensed notification 810 may include text indicative that the sensor of the computing device is collecting sensory data and the application is denied access to the sensory data.

The first indicator 812 may include a visual representation of a microphone. However, the first indicator 812 may also be a visual representation of any sensor of the computing device. For example, the first indicator 812 may resemble a video camera. The first indicator 812 may blink intermittently or be otherwise animated within the interactive display screen of the computing device to indicate that the sensor of the computing device is collecting sensory data from an ambient environment. The first indicator 812 may also be configured to change states to indicate that an application configured to run on the computing device is denied access to the sensory data. For example, while the sensor is collecting sensory data and the application is denied access to the sensory data, the first indicator 812 may resemble a microphone within a circular background with one or two diagonal line segments superimposed over the microphone. The circle may include dashed segments so as to be distinguishable from other embodiments of indicators that indicate that the application is receiving and processing sensory data. The first indicator 812 may further be configured to blink intermittently to be noticeable. The first indicator 812 may also resemble a human ear with one or two diagonal line segments superimposed on the ear so as to indicate that the application is denied access to the sensory data being collected by the sensor.

FIG. 8C is an illustration of an example display associated with the described method. Illustrated in FIG. 8C are an expanded notification area 820, a first indicator 822, a second indicator 824, a mute toggle button 826, and a permissions button 828.

The expanded notification 820 may include the first indicator 822, the second indicator 824, the mute toggle button 826, and the permissions button 828. The expanded notification 820 may be displayed in the notification drawer of the interactive display screen. The expanded notification 820 may include a first row and a second row. The first row may include the first indicator 822 and the second indicator 824. The second row may include the mute toggle button 826 and the permissions button 828.

The first indicator 822 may indicate that the application is denied access to sensory data. By further example, first indicator 822 may include a microphone enclosed in a circular background. The circular background may include dashed segments so as to distinguish the first indicator 822 from other embodiments that indicate that the application is receiving sensory data.

The second indicator 824 may be a visual representation of the application transmitting sensory data, or any symbol recognizable as being associated with the application.

The mute toggle button 826 may be configured to receive input indicating to change whether the application is receiving the sensory data. For example, in a state where the application is being denied the sensory data, a selection at the mute toggle button 826 would change the state of the computing device so that the application is receiving sensory data.

The permissions button 828 may be configured to receive input indicating to display a list of data use permissions corresponding to the application. The list of data use permissions may also be selectable so as to indicate data use permissions that are applied to the application.

Figure 9:
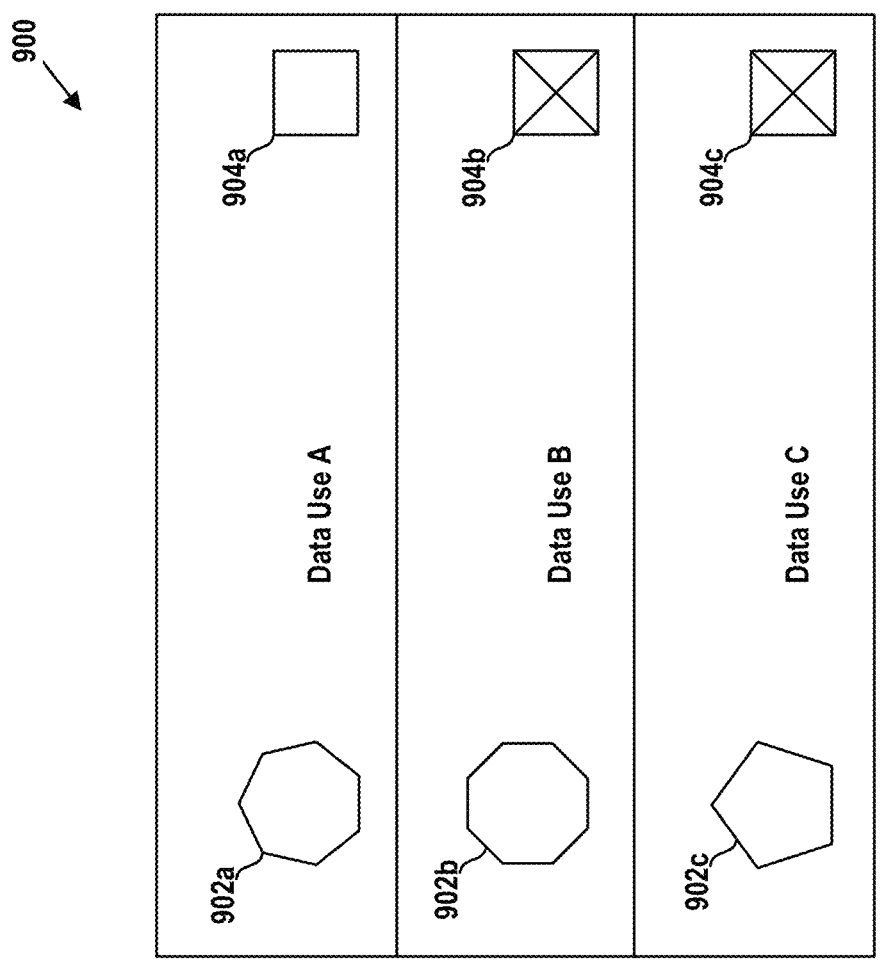
FIG. 9 is an example listing of one or more data use permissions.

FIG. 9 is an example listing 900 of one or more data use permissions. Illustrated in FIG. 9 are data use icons 902*a-c* and data use checkboxes 904*a-c*.

The data use icons 902*a-c* may be visual representations of data uses A-C, respectively. The data uses A-C may represent functions that applications configured to run on a computing device may perform with sensory data collected by a sensor of the computing device. The data use icons 902*a-c* may be visual depictions of functions represented by data uses A-C, respectively. For example, the data use icon 902*a* may appear to be a visual depiction of a radio transmitter and may indicate a data use that includes transmitting sensory data away from the computing device. By further example, the data use icon 902*b* may resemble a memory device and may indicate a data use that includes storing sensory data to a memory device. The data use 902*c* may resemble a human ear and may indicate a data use that includes listening for predetermined keywords within the sensory data.

The data use checkboxes 904*a-c* may be indicative of whether the data uses A-C are respectively allowed for applications configured to run on the computing device. For example the data use checkbox 904*a* may be unchecked or void of markings indicative that data use A is applied to an application configured to run on the computing device. The application may be denied access to data for use in accordance with data use A. The data use checkboxes 904*b* and 904*c* may be checked or marked in a manner indicating that data use B and data use C are applied to the application. The application may be allowed to use data in accordance with data use B and data use C. The data use checkboxes 904*a-c* may indicate selected data uses for either a single application or a plurality of applications.

Figure 10:
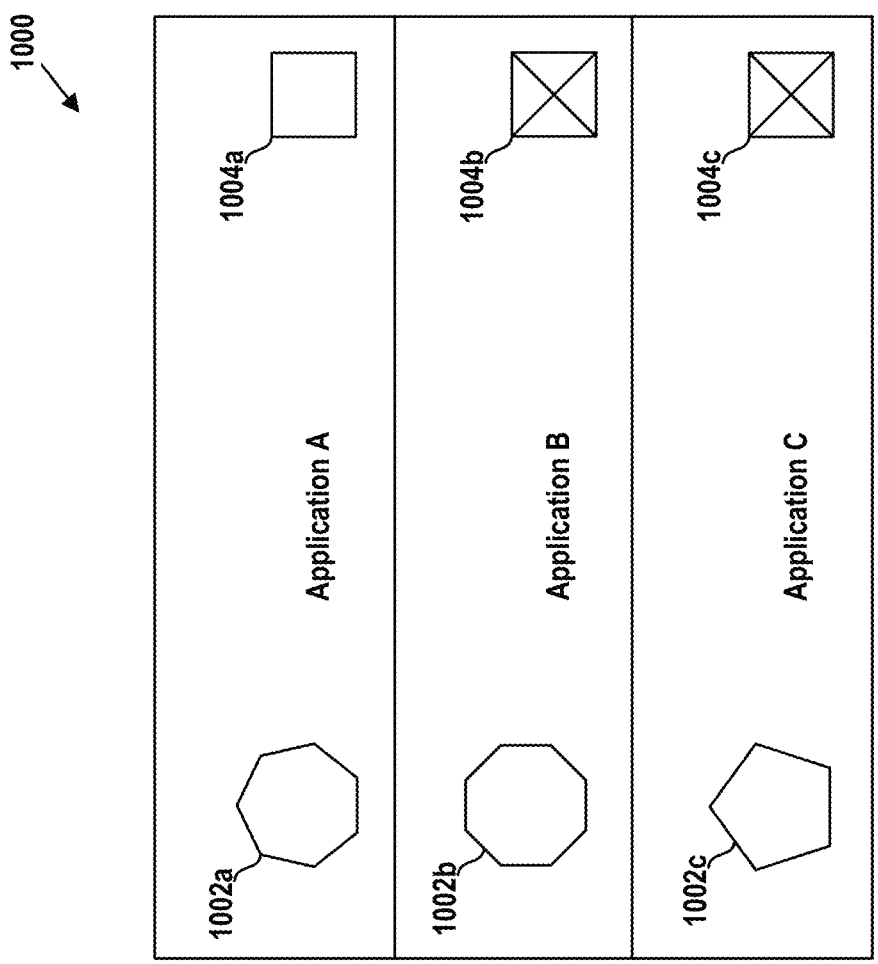
FIG. 10 is an example listing of one or more applications configured to run on a computing device.

FIG. 10 is an example listing 1000 of one or more applications configured to run on a computing device. Illustrated in FIG. 10 are application icons 1002*a-c* and application checkboxes 1004*a-c*.

The application icons 1002*a-c* may be visual representations of applications A, B, and C, respectively. Applications A-C may be configured to run on the computing device and to use sensory data collected by a sensor of the computing device. The application icons 1002*a-c* may be visual depictions of a function of the respective applications or may be a symbol otherwise recognizable as being associated with the application. For example, the application icon 1002*a* may appear to be a visual depiction of a notepad and may represent application A associated with a word processor.

The application checkboxes 1004*a-c* may be indicative of whether applications A-C are untrusted applications, respectively. For example, the application checkbox 1004*a* may be unchecked or void of markings, indicating that application A is not an untrusted application. Application A may be provided sensory data without regard to data use permissions associated with untrusted applications. By further example, the application checkboxes 1004*b* and 1004*c* may be checked or marked in a manner indicating that application B and application C are untrusted applications. The sensory data may be shared with applications B and C subject to selected data use permissions corresponding to untrusted applications. Alternatively, checkmarks or markings appearing within the application checkboxes 1004a-c may indicate that applications A-C, respectively, are not untrusted applications. Applications A-C may access data without regard to data use permissions associated with untrusted applications.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   providing for display, by a computing device that includes one or more processors, a representation of a first indicator, wherein the first indicator indicates a sensor of the computing device is collecting sensory data from an ambient environment of the computing device, wherein the first indicator is configured to change states so as to further indicate an application running on the computing device is receiving and processing the sensory data;
   providing for display, by the computing device, a representation of a second indicator that identifies the application receiving the sensory data collected by the sensor of the computing device;
   providing for display, via a graphical interface of the computing device, two or more selectable indications, wherein the two or more selectable indications respectively represent distinct data use permissions that include two or more of (i) listening for one or more predetermined keywords, wherein the application is configured to perform a function based on detection of the one or more predetermined keywords, (ii) the computing device storing sensory data, and (iii) transmitting sensory data away from the computing device;
   receiving, via the graphical interface, at least one respective selection of at least one selectable indication of the two or more selectable indications; and
   providing the sensory data to the application for use in accordance with at least one data use permission respectively represented by the at least one selectable indication, wherein the sensory data provided to the application is the sensory data indicated by the first indicator as being collected by the computing device, and wherein the sensory data is provided to the application identified by the second indicator.

2. The method of claim 1, wherein the first indicator is further configured to change states so as to further indicate the application is running in a background on the computing device and listening for one or more predetermined keywords, wherein the application is configured to perform a function based on detection of the one or more predetermined keywords.

3. The method of claim 1, wherein the first indicator is further configured to change states so as to further indicate the application is running in a background on the computing device and storing the sensory data in a memory device.

4. The method of claim 1, wherein the first indicator is further configured to change states so as to further indicate the application is running in a background or a foreground on the computing device and transmitting the sensory data away from the computing device.

5. The method of claim 1, wherein the first indicator is further configured to change states so as to further indicate the application is denied access to the sensory data and the second indicator is further configured to identify the application that is denied access to the sensory data.

6. The method of claim 5, wherein the first indicator and the second indicator are included in a first row of the display, wherein the first row further includes text indicating the application is denied access to the sensory data, and wherein the first row further includes text identifying the application.

7. The method of claim 6, further comprising:
   providing a mute toggle button in a second row of the display, wherein the mute toggle button is selectable to indicate whether the application is allowed access to the sensory data; and
   providing a permissions button in the second row of the display, wherein the permissions button is selectable to indicate a list of data use permissions for the application.

8. The method of claim 1, further comprising:
   receiving an indication that the sensor of the computing device is collecting sensory data from the ambient environment; and
   based on receipt of the indication, displaying the first indicator on a display of the computing device.

9. The method of claim 1, wherein the sensor includes a microphone and the sensory data includes audio data, and the method further comprises:
   receiving an indication that the microphone is continuously collecting audio data from the ambient environment; and
   based on receipt of the indication, determining whether a given application running on the computing device is receiving and processing the audio data.

10. The method of claim 1, wherein the first indicator is configured to change to one of a plurality of states, and the method further comprises:
    providing for display text indicative of one of the plurality of states, wherein the plurality of states includes (i) the application is running in a background on the computing device and listening for one or more predetermined keywords that cause the application to perform a function, (ii) the application is running in the background on the computing device and storing the sensory data, and (iii) the application is running in the background or a foreground on the computing device and transmitting the sensory data away from the computing device.

11. The method of claim 1, further comprising:
    determining whether a given application running on the computing device is receiving and processing the sensory data; and
    based on the determination, displaying the representation of the second indicator that identifies the given application receiving the sensory data collected by the sensor of the computing device.

12. The method of claim 1, further comprising:
receiving an indication that the sensor of the computing device is collecting the sensory data from the ambient environment;
displaying the first indicator on a display of the computing device;
determining whether a given application running on the computing device is receiving and processing the sensory data; and
based on the determination, displaying the second indicator that identifies the given application receiving the sensory data collected by the sensor of the computing device.

13. The method of claim 1, wherein the application is a first application and the at least one respective selection is a first at least one respective selection, the method further comprising:
providing for display, a list of one or more applications configured to run on the computing device;
receiving a second selection indicating that a second application of the one or more applications is an untrusted application, wherein an untrusted application is an application allowed to access sensory data subject to selected data use permissions, wherein a selected data use permission describes a function that an untrusted application is configured to perform by accessing sensory data;
providing for display a list of two or more data use permissions for untrusted applications;
receiving a third selection indicating that a permission of the list of two or more data use permissions applies to the second application configured to run on the computing device; and
providing the sensory data to the second application for use in accordance with the third selection.

14. The method of claim 13, wherein the list of two or more data use permissions include running in a background on the computing device and listening for one or more predetermined keywords, running in the background on the computing device and storing the sensory data, and running in the background or a foreground on the computing device and transmitting the sensory data away from the computing device.

15. The method of claim 1, wherein the first indicator and the second indicator are provided for display in a notification area of the display, wherein the notification area is an area of the display designated for displaying notification icons.

16. The method of claim 1, wherein the first indicator and the second indicator are provided for display in a notification drawer of the display, wherein the notification drawer is an area of the display designated for displaying notifications and is displayed in response to an input received at a notification area of the display, wherein the notification area is an area of the display designated for displaying notification icons.

17. A non-transitory computer readable storage memory having stored therein instructions, that when executed by a computing device that includes one or more processors, cause the computing device to perform functions comprising:
providing for display a representation of a first indicator, wherein the first indicator indicates a sensor of the computing device is collecting sensory data from an ambient environment of the computing device, wherein the first indicator is configured to change states so as to further indicate an application running on the computing device is receiving and processing the sensory data;
providing for display a representation of a second indicator that identifies the application receiving the sensory data collected by the sensor of the computing device;
providing for display, via a graphical interface of the computing device, two or more selectable indications, wherein the two or more selectable indications respectively represent distinct data use permissions that include two or more of (i) listening for one or more predetermined keywords, wherein the application is configured to perform a function based on detection of the one or more predetermined keywords, (ii) the computing device storing sensory data, and (iii) transmitting sensory data away from the computing device;
receiving, via the graphical interface, at least one respective selection of at least one selectable indication of the two or more selectable indications; and
providing the sensory data to the application for use in accordance with at least one data use permission respectively represented by the at least one selectable indication, wherein the sensory data provided to the application is the sensory data indicated by the first indicator as being collected by the computing device, and wherein the sensory data is provided to the application identified by the second indicator.

18. The non-transitory computer readable storage memory of claim 17, wherein the two or more selectable indications are provided for display in a notification drawer of the display, wherein the notification drawer is an area of the display designated for displaying notifications and is displayed in response to an input received at a notification area of the display, wherein the notification area is an area of the display designated for displaying notification icons.

19. A computing device comprising:
one or more processors; and
memory having stored therein instructions, that when executed by the one or more processors, cause the computing device to perform functions comprising:
providing for display a representation of a first indicator, wherein the first indicator indicates the computing device is collecting sensory data from an ambient environment of the computing device, wherein the first indicator is configured to change states so as to further indicate an application running on the computing device is receiving and processing the sensory data;
providing for display a representation of a second indicator that identifies the application receiving the sensory data collected by the computing device;
providing for display, via a graphical interface of the computing device, two or more selectable indications, wherein the two or more selectable indications respectively represent distinct data use permissions that include two or more of (i) listening for one or more predetermined keywords, wherein the application is configured to perform a function based on detection of the one or more predetermined keywords, (ii) the computing device storing sensory data, and (iii) transmitting sensory data away from the computing device;
receiving, via the graphical interface, at least one respective selection of at least one selectable indication of the two or more selectable indications; and
providing the sensory data to the application for use in accordance with at least one data use permission respectively represented by the at least one selectable indication, wherein the sensory data provided to the application is the sensory data indicated by the first indicator as being collected by the computing device, and wherein the sensory data is provided to the application identified by the second indicator.

20. The computing device of claim 19, wherein the first indicator is further configured to change states so as to further indicate the application is running in a background or a foreground on the computing device and transmitting the sensory data away from the computing device.

* * * * *